US009461715B1

(12) United States Patent
Desai et al.

(10) Patent No.: US 9,461,715 B1
(45) Date of Patent: Oct. 4, 2016

(54) PHYSICAL SERVER LOCATION IDENTIFICATION

(71) Applicant: INTERNATIONAL BUSINESS MACHINES CORPORATION, Armonk, NY (US)

(72) Inventors: Anand T. Desai, Austin, TX (US); Douglas Griffith, Spicewood, TX (US); Sreenivas Makineedi, Austin, TX (US); Srinivasa R. Muppala, Austin, TX (US)

(73) Assignee: International Business Machines Corporation, New York, NY (US)

( * ) Notice: Subject to any disclaimer, the term of this patent is extended or adjusted under 35 U.S.C. 154(b) by 0 days.

(21) Appl. No.: 14/987,635

(22) Filed: Jan. 4, 2016

(51) Int. Cl.
*G06F 15/16* (2006.01)
*H04B 5/00* (2006.01)
*G06K 19/077* (2006.01)
*H04W 4/00* (2009.01)

(52) U.S. Cl.
CPC ........ *H04B 5/0062* (2013.01); *G06K 19/07713* (2013.01); *H04W 4/008* (2013.01)

(58) Field of Classification Search
CPC .................................................. G06Q 10/087
See application file for complete search history.

(56) References Cited

U.S. PATENT DOCUMENTS

| 7,436,303 | B2* | 10/2008 | Tourrilhes | G06Q 10/06 235/385 |
|---|---|---|---|---|
| 8,674,822 | B2 | 3/2014 | Priyantha et al. | |
| 2007/0222597 | A1* | 9/2007 | Tourrilhes | G06Q 10/06 340/572.1 |
| 2007/0250410 | A1* | 10/2007 | Brignone | G06Q 10/087 705/28 |
| 2009/0207022 | A1* | 8/2009 | Reckeweg | G06K 7/0008 340/572.1 |
| 2015/0256386 | A1 | 9/2015 | Palmer et al. | |

OTHER PUBLICATIONS

Wessel, "T-Systems, Intel Test RFID to Track Servers at Model Data Center," RFID Journal, Feb. 1, 2012.

* cited by examiner

*Primary Examiner* — Moustafa M Meky
(74) *Attorney, Agent, or Firm* — Weitzman Law Offices, LLC

(57) ABSTRACT

A server and rack system includes at least one server rack; multiple server slots within the rack; multiple near field communication (NFC) tags; a server located within one of the server slots; an NFC reader within and powered by the server; and an entity that needs to receive locations of servers within racks of the system. Each of the multiple NFC tags is positioned on the rack so as to individually correspond, on a one-to-one basis, with each of the multiple server slots, and each of the NFC tags is programmed with an identifier of the specific rack and slot with which it corresponds, and the NFC reader is positioned such that, when power is supplied to the NFC reader by the server, the NFC reader will read the identifier that corresponds to the slot the server is located within and automatically communicate that identifier to the entity.

1 Claim, 3 Drawing Sheets

PHYSICAL SERVER LOCATION IDENTIFICATION

FIELD OF THE INVENTION

This disclosure relates generally to computer equipment configuration management and, more particularly, identification of the location of individual servers in racks.

BACKGROUND

Large server farms and cloud centers may have several thousand servers placed in racks. Today, various cloud based services need to consider locality of the servers in order to optimize their resiliency and performance. Therefore, it has become increasingly important for the server itself to know its location within the data center (rack # and U slot).

For example, Apache Hadoop is an open-source software framework for distributed storage and distributed processing of very large data sets on computer clusters built from commodity hardware. One of the requirements for Hadoop is that, for effective scheduling of work, every Hadoop-compatible file system should provide location awareness: the name of the rack where a worker node is located. Hadoop applications can use this information to ideally run work on the node where the data is located or, if not possible, ideally on the same rack and switch to reduce backbone traffic.

Likewise, such knowledge is needed in the OpenStack "SWIFT" architecture for the "ring" aspect because a ring represents a mapping between the names of entities stored on disk and their physical location. There are separate rings for accounts, containers, and one object ring per storage policy. When other components need to perform any operation on an object, container, or account, they need to interact with the appropriate ring to determine its location in the cluster.

Most conventional methods for identifying the locations of servers in racks are prone to errors, due to human error itself or mis-wiring.

Another approach involves separately installing physical contacts on the rack frame and a corresponding set of contacts on the server that form a physical connection between the two and allows the server to read its location via the contacts. However, this physical connection is a potential source of failure due to misalignment or degradation of the contacts over time as servers are inserted and removed.

Thus, there is an ongoing technological problem involving the need for a fully automatic way for a server to identify its location in a rack that is highly reliable, low cost and is not subject to physical degradation from use.

SUMMARY

One aspect of this disclosure involves a server and rack system including at least one server rack, multiple server slots within the at least one rack, multiple near field communication (NFC) tags, a server located within one of the multiple server slots, and an NFC reader within and powered by the server. The system also involves an entity that needs to receive locations of servers within racks of the system. The system is configured such that each of the multiple NFC tags is positioned on the rack so as to individually correspond, on a one-to-one basis, with each of the multiple server slots, and each of the NFC tags is programmed with an identifier of the specific rack and slot with which it corresponds. The NFC reader is positioned such that, when power is supplied to the NFC reader by the server, the NFC reader will read the identifier programmed into the NFC tag that corresponds to the slot the server is located within and automatically communicate that identifier to the entity.

Advantageously, our solution eliminates the problems inherent with a physical connection. Still further, it can easily be retrofitted to existing racks. It is also automatic, so it eliminates the likelihood of human error.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to address the aforementioned problems.

Figure 1:
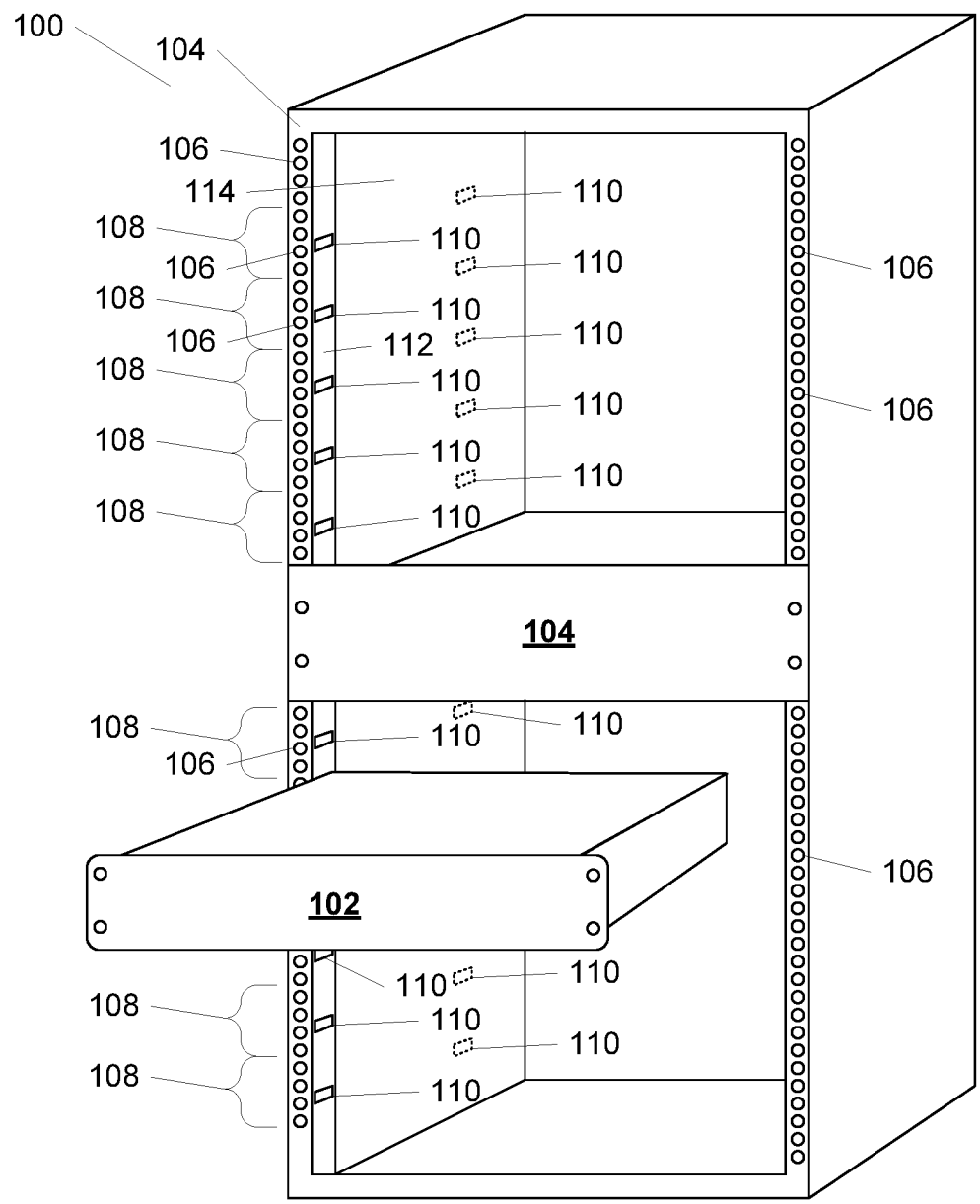
FIG. 1 illustrates, in simplified form, a rack equipped with our solution for automatically locating the rack and slot of a server.

FIG. 1 illustrates, in simplified form, a rack 100, for example, a 42U rack, equipped with our solution for automatically locating the rack and slot of a server as described herein. The rack 100 front is open so that it can receive server(s) 102 inserted therein (only one of which is shown). The front frame 104 of the rack includes a series of multiple conventional mounting holes 106 via which servers 102 can be affixed to the rack 100 following insertion. The mounting holes 106 conceptually define multiple slots 108 for the servers 102 to be inserted into.

As shown, and as is typical, the rack 100 further includes a mid-rack switch 104 mounted therein via which servers 102 within the rack can communicate with each other. In use, the rack 102 will also include a top rack switch (not shown) via which rack to rack communication can occur.

In accordance with our solution, the rack further includes multiple near field communication (NFC) tags 110 mounted either on an interior edge 112 of the frame 104 or, alternatively, on an interior side surface 114 of the rack 100. Each NFC 110 tag is programmed with an identifier of at least the rack 102 within which it resides, along with the specific slot within that rack 102 with which it corresponds. Thus, each NFC tag 110 will individually correspond, on a one-to-one basis, with a single slot and thereby uniquely identify each rack/slot combination. Advantageously, NFC tags are inexpensive and require no direct power source, so attachment to a rack 100 during manufacture is simple.

NFC tags and readers typically work on a frequency of 13.56 MHZ at a range of up to about 10 cm or less, but more practically at about 4 cm. There are multiple standards that govern NFC, for example ISO/IEC 18092/ECMA-340 and ISO/IEC 21481/ECMA-352, and any suitable NFC tag reader combination can be used. Since NFC 110 tags are commercially available from multiple sources and the programming of NFC tags 110 is also well known, those aspects will not be discussed herein.

Figure 2:
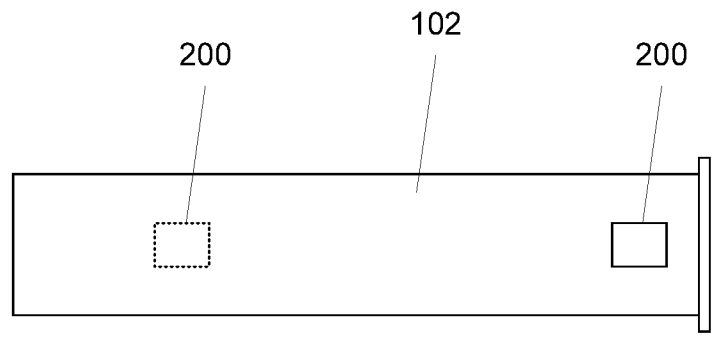
FIG. 2 illustrates, in simplified form, a side view of the server 102 of FIG. 1.

FIG. 2 illustrates, in simplified form, a side view of the server 102 of FIG. 1. As shown, an NCF reader 200 is incorporated into the server 102 on or near the side 202 that would face the NFC tag 110 when inserted into a slot 108 of the rack 100. The NFC reader 200 of the server 102 is positioned to closely correspond to the corresponding NFC tag 110 when the server 102 is within a slot 108 of the rack 100. Advantageously, since the NFC reader 200 is contained within the server 102, it can obtain its power directly from the power source for the server 102.

Figure 3:
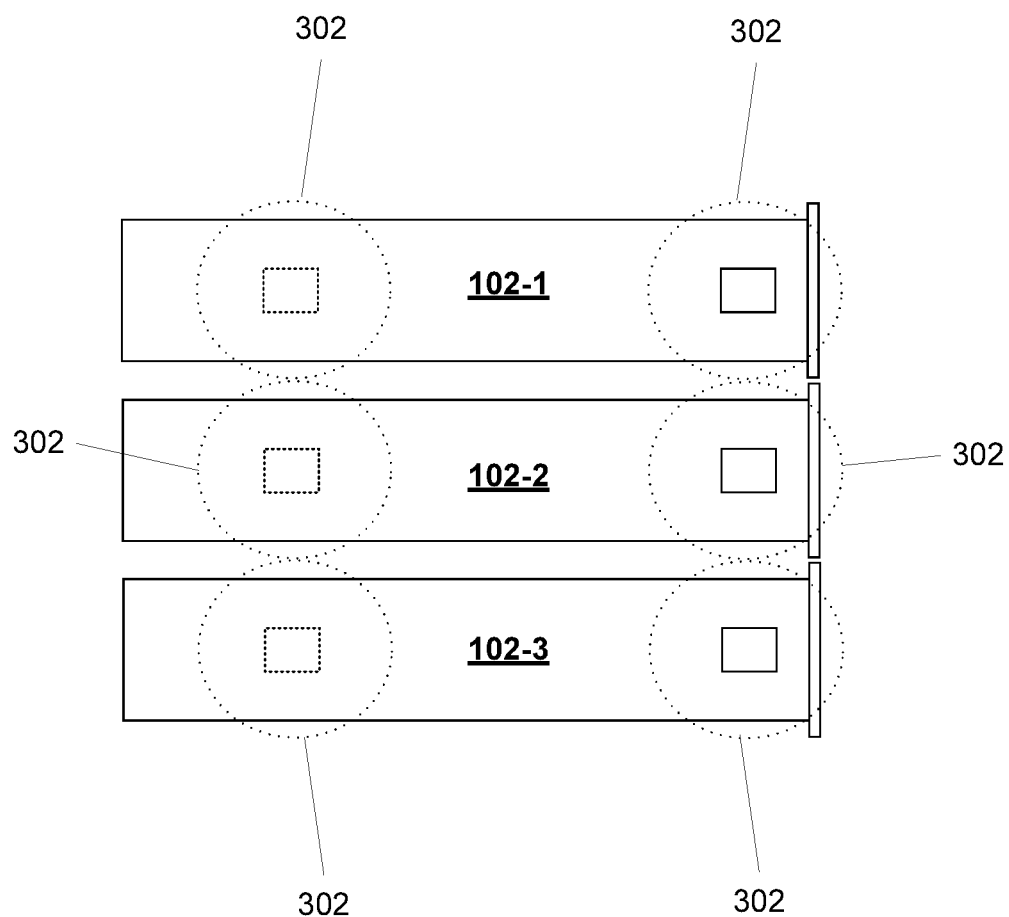
FIG. 3 illustrates, in simplified form, a side view of three servers as they might be arranged within a rack as described herein.

Ideally, the NFC reader 200 position is also such that, when inserted into a rack, it cannot read NFC tag 110 for an adjacent slot. FIG. 3 illustrates, in simplified form, a side view of three servers 102-1, 102-2, 102-3 as they might be arranged within a rack 100 as described herein.

Ideally, as shown in FIG. 3, the NFC readers 200 and NFC tags 110 are selected and located such that the read radius 302 of each NFC reader 200 prevents each NFC reader 200 from reading the NFC tags 110 in all adjacent slots 108. Since the typical read radius is about 4 cm, this can be ensured, if necessary, for example, through shielding the NFC reader 200 within the server 102 (and shielding between adjacent racks 100 as well as necessary or appropriate). Alternatively, if shielding the NFC reader 200 is not possible and it may read an NFC tag 110 from an adjacent slot, the NFC reader 200 can use, for example, signal strength to discern which is the proper NFC tag 110 for its slot.

Advantageously, it should be appreciated that, by using the NFC tag 110 and NFC reader 200, alignment between the two is not critical and no physical contact between the two is required, so the prospect of misalignment and wear present with physical contacts is eliminated.

Figure 4:
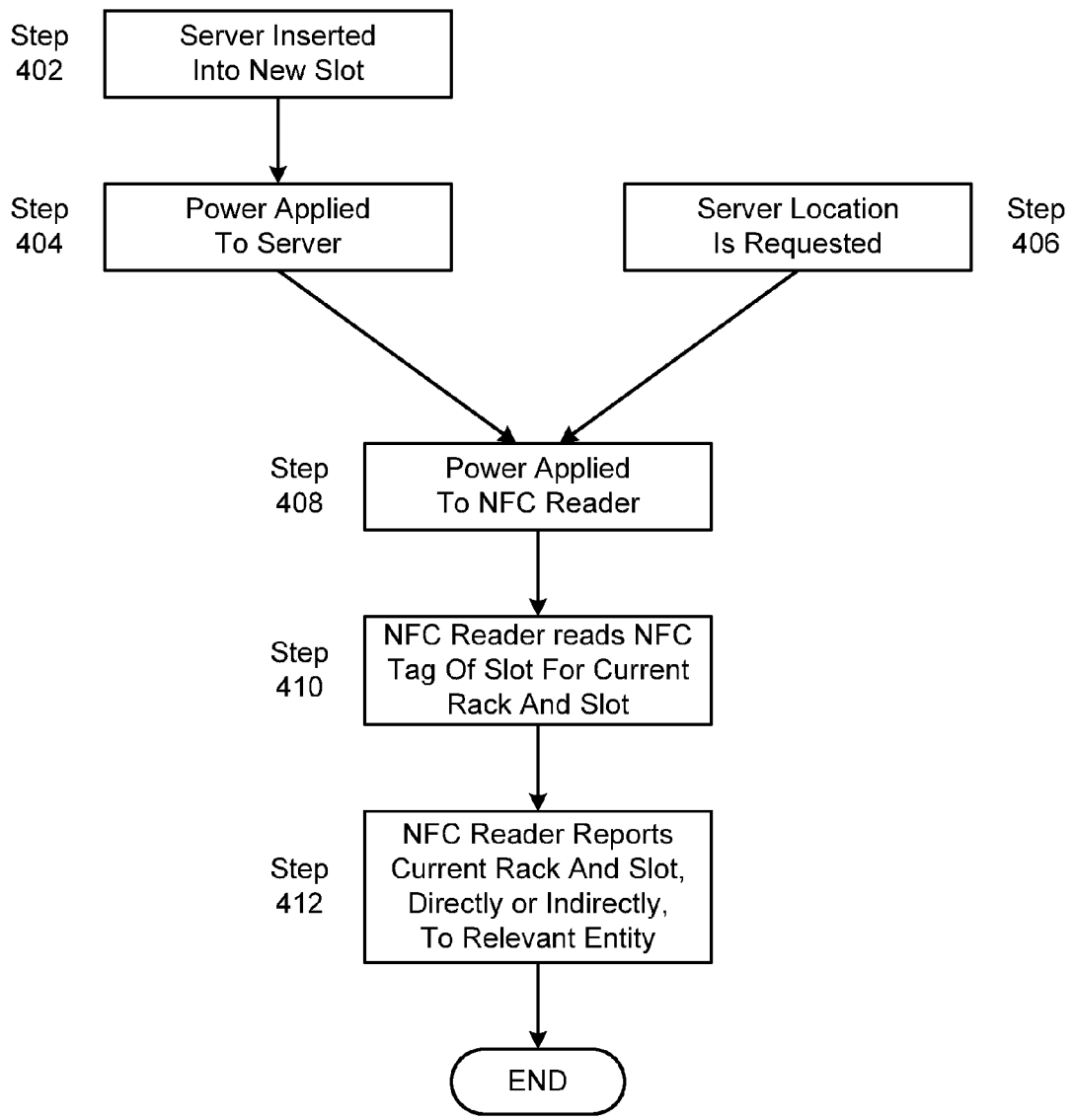
FIG. 4 is a simplified flowchart, illustrating the operation of the instant system under two different potential scenarios.

FIG. 4 is a simplified flowchart, illustrating the operation of the instant system under two different potential scenarios.

The first scenario is from the standpoint of populating a new rack 100 with servers 102 or adding a new server 102 into an existing rack 100. With this scenario, one or more servers 102 are inserted into respective slot(s) in the rack 100 (Step 402). Once everything appropriate has been physically installed and connected, power is applied to the server(s) 102.

The second scenario is from the standpoint of a server 102 that is already installed in a rack 100 and operating. With this scenario, some entity requests that a server identify its location (Step 406). Depending upon the particular implementation, for example, the entity may be a Hadoop file system, part of a OpenStack Swift architecture, a program that needs to populate a configuration file or set up a data repository for use by Hadoop or Swift services, an inventory control program, a software installation program, etc.

Under both scenarios, following Step 404 or Step 406, power is applied to the NFC reader 200 of the server (Step 408). The NFC reader 200 then reads the NFC tag 110 for its slot within the rack 100 (Step 410), and, either directly or indirectly, reports its current rack and slot to the relevant (typically the requesting) entity.

Thus, it should now be appreciated that the system can automatically, and without human intervention, convey server rack and position within the rack without any human intervention. Moreover, if a server needs to be removed and a new one installed, there is no need for a person to modify wiring, change any settings or manually update any configuration or other file contents because the location of any server within the rack can be polled and will be known to be accurate.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A server and rack system comprising:
at least one server rack;
multiple server slots within the at least one rack;
multiple near field communication (NFC) tags;
a server located within one of the multiple server slots;
an NFC reader contained within, and powered by the server; and
an entity that needs to receive locations of servers within racks of the system;
wherein each of the multiple NFC tags is positioned on the rack so as to individually correspond, on a one-to-one basis, with each of the multiple server slots, and each of the NFC tags is programmed with an identifier of the specific rack and slot with which it corresponds; and
wherein the NFC reader is positioned such that, when power is supplied to the NFC reader by the server, the NFC reader will automatically without human intervention read the identifier programmed into the NFC tag that corresponds to the slot the server is located within, without reading any adjacent slot and automatically communicate that identifier to the entity.

* * * * *